United States Patent Office 3,786,147
Patented Jan. 15, 1974

3,786,147
METHOD OF CONTROLLING POULTRY COCCIDIOSIS
Masatoshi Nagawa, Yoshio Suzuki, Katsuaki Matsui, and Yoshiyasu Tsurusaki, Tokyo, and Masaoki Iijima, Matsudo, Japan, assignors to Sankyo Company Limited, Tokyo, Japan
No Drawing. Continuation of application Ser. No. 859,478, Sept. 18, 1969, which is a continuation of application Ser. No. 575,241, Aug. 26, 1966, both now abandoned. This application Apr. 27, 1971, Ser. No. 138,005
Claims priority, application Japan, Sept. 2, 1965, 40/53,778; Nov. 10, 1965, 40/68,501; June 30, 1966, 41/42,102
Int. Cl. A61k 27/00
U.S. Cl. 424—251       2 Claims

ABSTRACT OF THE DISCLOSURE

Poultry coccidiosis is combatted by administering to poultry an anticoccidial amount of 3 - (2 - methyl-4-amino-5-pyrimidinyl)methyl-4-methyl-5-(2-chloroethyl)thiazolium chloride hydrochloride or 3 - (2 - methyl-4-amino-5-pyrimidinyl)-methyl-4-methyl-5 - (2 - chloroethyl)thiazolium naphthalene 1,5-disulfonate.

0.004–0.6% by weight of the respective compound is incorporated in poultry feed for obtaining the best results.

CROSS REFERENCE TO PRIOR APPLICATIONS

This is a continuation of application Ser. No. 859,478, filed Sept. 18, 1969, which in turn was a continuation of Ser. No. 575,241, filed Aug. 26, 1966, and both now abandoned.

SUMMARY OF THE INVENTION

This invention relates to novel compositions and methods for the treatment and prevention of the poultry disease coccidiosis. More particularly, it is concerned with novel compositions containing as an active anticoccidial agent certain thiazolium quaternary salts.

Coccidiosis is a common and widespread disease of poultry, especially chickens and turkeys. The disease is caused by species of protozoan parasites of the genus Eimeria. The more important of these species are *E. maxima, E. acervulina, E. tenella, E. necatrix, E. brunetti, E. praecox, E. malagridis, E. adenoides* and *E. mitis.* The severe forms of the diseases lead frequently to poor weight gain, reduced feed efficiency and high mortality. Accordingly, the successful control of coccidiosis is highly important to the poultry industry.

It is an object of this invention to provide novel compositions which are effective in treating and preventing coccidiosis. Another object of this invention is to provide a novel method for the treatment and prevention of coccidiosis. Other objects will become apparent from the following detailed description of this invention.

In accordance with this invention, it has now been found that the following two thiazolium quaternary salts give excellent results not obtained by other quaternary salts:

3 - (2-methyl-4-amino-5-pyrimidinyl)-methyl-4-methyl-5- (2-chloroethyl) thiazolium chloride hydrochloride and naphthalene 1,5-disulfonate.

The compounds are conveniently fed to poultry as a component of the feed or drinking water, but they may also be administered orally dispersed or admixed with other carriers.

According to one aspect of this invention, novel compositions are provided in which the thiazolium quaternary salts are present as an active ingredient. Such compositions comprise the quaternary salt intimately dispersed in or admixed with an inert carrier. The term "inert carrier" as used herein means one that is substantially non-reactive with the active ingredient, orally ingestable and tolerated by the poultry.

The amount of thiazolium quaternary salt required for control of coccidiosis in poultry will vary somewhat with the specific compound employed. Generally, the thiazolium quaternary salts are effective in preventing the disease without undesirable side effect and toxic effect when administered at a level of more than about 0.004% by weight of the feed. For good prophylactic results, it is preferred that the feed contains between about 0.004 and 0.02% by weight of the active ingredient, more preferably between about 0.004 and 0.013%. When the thiazolium salts are to be employed for therapeutic purpose, the higher levels are used for shorter period of time. Thus, the concentrations of about 0.02% to about 0.06% by weight of the feed may be advantageously administered for treatment of coccidiosis. When these compounds are to be employed for therapeutic purpose, it is desirable to employ the lowest levels that exhibit anticoccidial activities, in order to eliminate any risk of side effects that may appear on prolonged feeding.

In preparing solid compositions, uniform dispersion of the active ingredient throughout the carrier can be readily accomplished by the conventional methods of grinding, stirring or milling.

The thiazolium quaternary salts are advantageously administered to poultry by way of the drinking water of the birds. This method of treatment may often be employed in the therapeutic use, since poultry with coccidiosis are apt to consume less solid feed than normal birds. The water-soluble quaternary salts may be added directly to the drinking water.

According to another aspect of this invention, novel compositions are provided in which active ingredient is present in relatively large amounts and which are suitable for addition to the poultry feed directly or after intermediate dilution step. Such compositions which are a preferred feature of this invention are the so-called feed supplements or premix. Representative examples of the carirers to be employed in this invention are solid oral carriers such as distillers dried grains, corn starch, potato starch, fermentation residues, ground oxyster shells, Attapulgus clay, rice bran, wheat bran, wheat middling, molasses solubles, corn meal, edible vegetable substances, soybean cake, soybean meal, antibiotic mycelis, crushed lime stone and the like. The quaternary salts are intimately dispersed or admixed throughout the solid inert carrier as described hereinabove. Formulations containing from about 5% to about 30% by weight, and preferably from about 10–25% by weight, of the active ingredient are particularly suitable for this purpose. It is preferable in the industry to use about 1–3 kg. of such a supplement per ton of feed.

Typical feed supplements containing quaternary salts dispersed in an inert carrier include, for example, the following;

Quaternary salt: Parts by weight
(A) 3 - (2 - methyl - 4-amino-5-pyrimidinyl)-methyl-4 - methyl - 5 - (2-chloroethyl) thiazolium chloride hydrochloride ———————————— 25
Wheat bran ———————————————— 75
(B) 3 - (2 - methyl-4-amino-5-pyrimidinyl)-methyl-4 - methyl-5-(2-chloroethyl) thiazolium naphthalene 1,5-disulfonate ———————————— 20
Rice bran ————————————————— 80

The quaternary salts may be easily obtained by a known procedure, for example, by reacting together a mono- or di-acid salt of a compound having the Formula II with a suitable inorganic or organic acid:

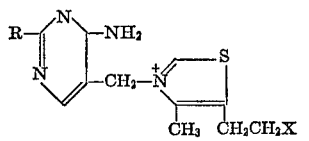

wherein R is lower alkyl and X is chlorine.

The preparation of the typical compounds, the formulation of the compounds and the coccidiostatic activity of the compounds are more fully illustrated by the non-limiting examples as follows.

In these examples, all the parts are given by weight unless otherwise indicated.

Example 1

Twenty-five parts of 3 - (2 - methyl - 4 - amino-5-pyrimidinyl)-methyl - 4 - methyl-5-(2-chloroethyl) thiazolium chloride hydrochloride are uniformly mixed with 75 parts of wheat bran.

The resulting feed supplement contains 25% active ingredient. Uniform mixing of one part of the supplement with 1,000 parts of the poultry feed gives a feed composition containing 0.025% active ingredient.

Example 2

To a solution of 56 g. (0.15 mole) of 3-(2-methyl-4-amino - 5 - pyrimidinyl)-methyl - 4-methyl-5-(2-chloroethyl) thiazolium chloride hydrochloride in 280 ml. of water is added a solution of 53 g. (0.15 mole) of disodium naphthalene-1,5-disulfonate in 470 ml. of water.

The crystalline substance which separates is filtered, washed with water and dried to give 81.4 g. of 3-(2-methyl - 4 - amino - 5 - pyrimidinyl)-methyl-4-methyl-5-(2-chloroethyl) thiazolium naphthalene-1,5-disulfonate. M.P. 276° C. (with decomposition).

Twenty parts of the thiazolium naphthalene-1,5-disulfonate are uniformly mixed with 90 parts of rice bran. The resulting feed supplement contains 20% active ingredient. One part of the supplement is uniformly mixed with 2,000 parts of the poultry feed to give a feed containing 0.04% active ingredient.

Example 3

The coccidiostatic activity of the thiazolium quaternary salts of this invention is determined by the following method:

Groups of twenty two-week old white leghorn chicks are fed a diet containing various amounts of the quaternary salts. After being on this ration for 24 hours, each chick is inoculated with 40,000 sporulated oocysts of *Eimeria tenella*. Another group of nineteen chicks is fed a similar diet which contains no coccidiostat. This group is also infected after 24 hours and served as infected control.

The diets are administered to the chicks for eight days following the date of infection. At the end of this time the infected birds still living are sacrificed. The oocyst count is determined by a microscopic examination of the cecal homogenates.

The results are shown in the following table, with mortality, weight gain and average degree of infection.

It will be evident from the above results that the thiazolium quaternary salts of the invention possess an extremely high degree of activity against protozoa which cause coccidiosis, accompanied by good weight gain of the poultry.

TABLE

| Compound | Percent Compound in feed | Mortality | Grams weight gain | Average degree of infection [1] | No. o oocysts/ g. of ceca |
|---|---|---|---|---|---|
| 3-(2-methyl-4-amino-5-pyrimidinyl)-methyl-4-methyl-5-(2-chloroethyl) thiazolium chloride hydro chloride | 0.004 | 0 | 73.5 | 0.35 | 496,800 |
|  | 0.008 | 0 | 74.0 | 0.20 | 82,800 |
| 3-(2-methyl-4-amino-5-pyrimidinyl)-methyl-4-methyl-5-(2-chloroethyl) thiazolium naphthalene 1,5-disulfonate | 0.004 | 0 | 73.0 | 0.85 | 513,500 |
|  | 0.008 | 0 | 75.0 | 0.45 | 95,700 |
| Infected control |  | 31.5 | 39.4 | 2.42 | 938,400 |

[1] Average degree of infection: normal ceca is scored 0, and ceca with slight, moderate and severe coccidiosis lesions are scored 1, 2 and 3 respectively. When a bird dies, a score of 4 is given. The total of the scores of the bird group divided with number of the birds is defined as "average degree of infection."

What is claimed is:

1. A method of controlling poultry coccidiosis which comprises orally administering to poultry susceptible to coccidiosis an anticoccidial amount of a compound selected from the group consisting of
   3 - (2 - methyl - 4-amino-5-pyrimidinyl)-methyl-4-methyl-5-(2-chloroethyl) thiazolium chloride hydrochloride and
   3 - (2 - methyl - 4 - amino-5-pyrimidinyl)-methyl-4-methyl-5-(2-chloroethyl) thiazolium naphthaltne 1,5-disulfonate.

2. The method according to claim 1, wherein said compound is incorporated as the active ingredient in an anticoccidial composition containing from about 0.004 to about 0.06% by weight of said compound, calculated on the total weight of said composition, the remainder of the composition being an inert carrier.

References Cited
UNITED STATES PATENTS 3,088,867  5/1963  Rogers et al. ———————— 424—251
3,337,401  8/1967  Ishii et al. ———————— 424—251
3,483,292  12/1969  Ishii et al. ———————— 424—251

OTHER REFERENCES

Chem. Abst., vol. 62, pp. 4358b (1965).
Chem. Abst., vol 62, January–June Subject Index (1965), pp. 2699s.

SAM ROSEN, Primary Examiner